US012773954B2

(12) United States Patent
Diamond et al.

(10) Patent No.: US 12,773,954 B2
(45) Date of Patent: Oct. 27, 2026

(54) VEHICLE CENTER CONSOLE HAVING POWERED STORAGE COMPARTMENT COVER AND METHOD

(71) Applicant: Ford Global Technologies, LLC, Dearborn, MI (US)

(72) Inventors: Brendan Diamond, Grosse Pointe, MI (US); John Robert Van Wiemeersch, Novi, MI (US); Keith Weston, Canton, MI (US); Stuart C. Salter, White Lake, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 407 days.

(21) Appl. No.: 18/507,171

(22) Filed: Nov. 13, 2023

(65) Prior Publication Data

US 2025/0153648 A1 May 15, 2025

(51) Int. Cl.
*B60R 7/04* (2006.01)
*B60R 11/00* (2006.01)
(Continued)

(52) U.S. Cl.
CPC ................ *B60R 7/04* (2013.01); *B60R 11/00* (2013.01); *G06V 20/59* (2022.01); *G06V 20/64* (2022.01);
(Continued)

(58) Field of Classification Search
CPC ... B60R 7/04; B60R 11/00; B60R 2011/0007; B60R 2011/0084; B60R 2011/0092;
(Continued)

(56) References Cited

U.S. PATENT DOCUMENTS 9,863,171 B1 * 1/2018 Salter ...................... E05B 81/64
2005/0092097 A1 5/2005 Shank et al.
(Continued)

FOREIGN PATENT DOCUMENTS

CN 104895447 A 9/2015
FR 3069216 A1 1/2019
FR 3121101 A1 5/2023

OTHER PUBLICATIONS

DPCcars "2021 GMC Yukon Power Sliding Center Console", Youtube, youtube.com/watch?v=5bb25iR-WV8 (Year: 2020).*
(Continued)

*Primary Examiner* — Hitesh Patel
*Assistant Examiner* — Shien Ming Chou
(74) *Attorney, Agent, or Firm* — Vichit Chea; Price Heneveld LLP

(57) ABSTRACT

A vehicle includes a console having a base housing having a first compartment having an open top end, a powered cover coupled to the base housing and configured to move between an open compartment position exposing the first compartment, and a closed compartment position covering the first compartment, at least one sensor including an imaging camera located in the vehicle and orientated to capture images of the first compartment when the cover is in the open compartment position, and image processing for processing the captured images and detecting one or more objects determined to be of value located within the first compartment. A controller controls the powered cover to move the powered cover from the open compartment position to the closed compartment position when an item of value is detected located within the first compartment.

19 Claims, 7 Drawing Sheets

(51) Int. Cl.
*G06V 20/59* (2022.01)
*G06V 20/64* (2022.01)

(52) U.S. Cl.
CPC ................. *B60R 2011/0007* (2013.01); *B60R 2011/0084* (2013.01); *B60R 2011/0092* (2013.01)

(58) Field of Classification Search
CPC ........... B60R 7/06; B60R 11/04; G06V 20/59; G06V 20/64; G06V 20/60; B60K 37/00; B60K 37/20
See application file for complete search history.

(56) References Cited

U.S. PATENT DOCUMENTS

| | | | | |
|---|---|---|---|---|
| 2006/0082437 | A1 | 4/2006 | Yuhara | |
| 2015/0052958 | A1 | 2/2015 | Pericak et al. | |
| 2017/0193319 | A1 * | 7/2017 | Yasunaga ........... | G06K 7/10722 |
| 2020/0276981 | A1 | 9/2020 | Anderson | |
| 2020/0346531 | A1 * | 11/2020 | Dry ......................... | B60P 3/007 |
| 2021/0304122 | A1 * | 9/2021 | Dattamajumdar ... | A61G 12/001 |

OTHER PUBLICATIONS

Bendel, "Electrically Opened Center Console Storage—a new level of luxury in cars", www.accuride-europe.com (Year: 2017).*

* cited by examiner

VEHICLE CENTER CONSOLE HAVING POWERED STORAGE COMPARTMENT COVER AND METHOD

FIELD OF THE DISCLOSURE

The present disclosure generally relates to consoles and, more specifically, relates to a console having a moveable cover for transporting items in a vehicle.

BACKGROUND OF THE DISCLOSURE

Motor vehicles are commonly equipped with storage compartments, such as consoles. For example, a center console is often installed between a driver's seat and a passenger's seat in a front row of seating in a passenger motor vehicle. The center console typically has a main storage compartment with a lid, which also commonly serves as an armrest and may include one or more other storage compartments. It would be desirable to provide for a center console which provides an actuatable cover for covering items in a storage compartment in a motor vehicle.

SUMMARY OF THE DISCLOSURE

According to a first aspect of the present disclosure, a vehicle having a console having a base housing having a first compartment having an opening, a powered cover coupled to the base housing and configured to move between an open compartment position exposing the opening of the first compartment, and a closed compartment position covering the opening of the first compartment, at least one sensor including an imaging camera located in the vehicle and orientated to capture images of the first compartment when the cover is in the open compartment position, image processing for processing the captured images and detecting one or more objects determined to be of value located within the first compartment, and a controller controlling the powered cover to move the powered cover from the open compartment position to the closed compartment position when an item of value is detected located within the first compartment.

Embodiments of the first aspect of the present disclosure can include any one or a combination of the following features:

- the powered cover is operatively coupled to an actuator that actuates the cover between the open compartment position and the closed compartment position;
- the actuator has a linear actuator;
- the actuator has a motor;
- the opening is an open top end of the first compartment;
- the vehicle has a first seating assembly and a second seating assembly wherein the console is a center console disposed within a space between the first and second seating assemblies;
- a first tray is disposed within the first compartment for holding one or more items;
- the image processing compares captured images to known images stored in memory;
- a second compartment is provided in the base housing, wherein the second compartment has a pivoting lid that pivots between an open lid position and a closed lid position;
- the pivoting lid which operates as an armrest; and
- the second compartment is located rearward of the first storage compartment.

According to a second aspect of the present disclosure, a vehicle having a center console having a base housing comprising a first compartment having an open top end, a powered cover coupled to the base housing and having an actuator configured to move the powered cover between an open compartment position exposing the first compartment, and a closed compartment position covering the first compartment, at least one sensor including an imaging camera located in the vehicle and orientated to capture images of the compartment when the cover is in the open compartment position, an image processor for processing the captured images and detecting one or more objects determined to be of value located within the first compartment, and a controller controlling the powered cover to move the powered cover from the open compartment position to the closed compartment position when an item of value is detected located within the first compartment.

Embodiments of the second aspect of the present disclosure can include any one or a combination of the following features:

- the actuator has a motor;
- the actuator has a linear actuator;
- the vehicle has a first seating assembly and a second seating assembly, wherein the console is a center console disposed within a space between the first and second seating assemblies;
- a first tray is disposed within the first compartment for holding one or more items;
- the image processing compares captured images to known images stored in memory;
- a second storage compartment is provided in the base housing, wherein the second compartment further comprises a pivoting lid that pivots between an open lid position and a closed lid position;
- the pivoting lid further operates as an armrest; and
- the second storage compartment is located rearward of the first compartment.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
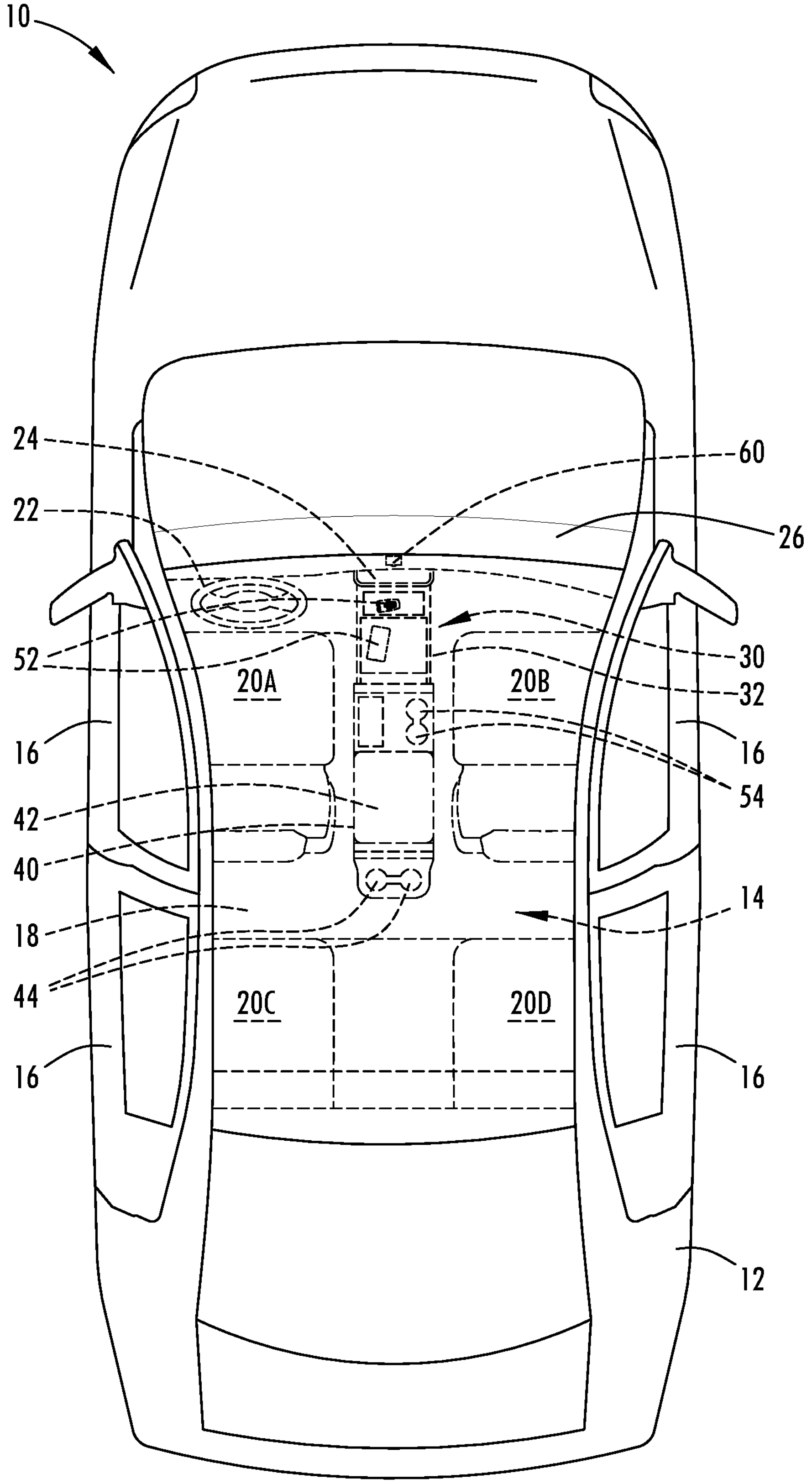
FIG. 1 is a top schematic view of a cabin interior of a motor vehicle equipped with a center console having a powered cover in an open console position, according to one example.
Figure 1A:
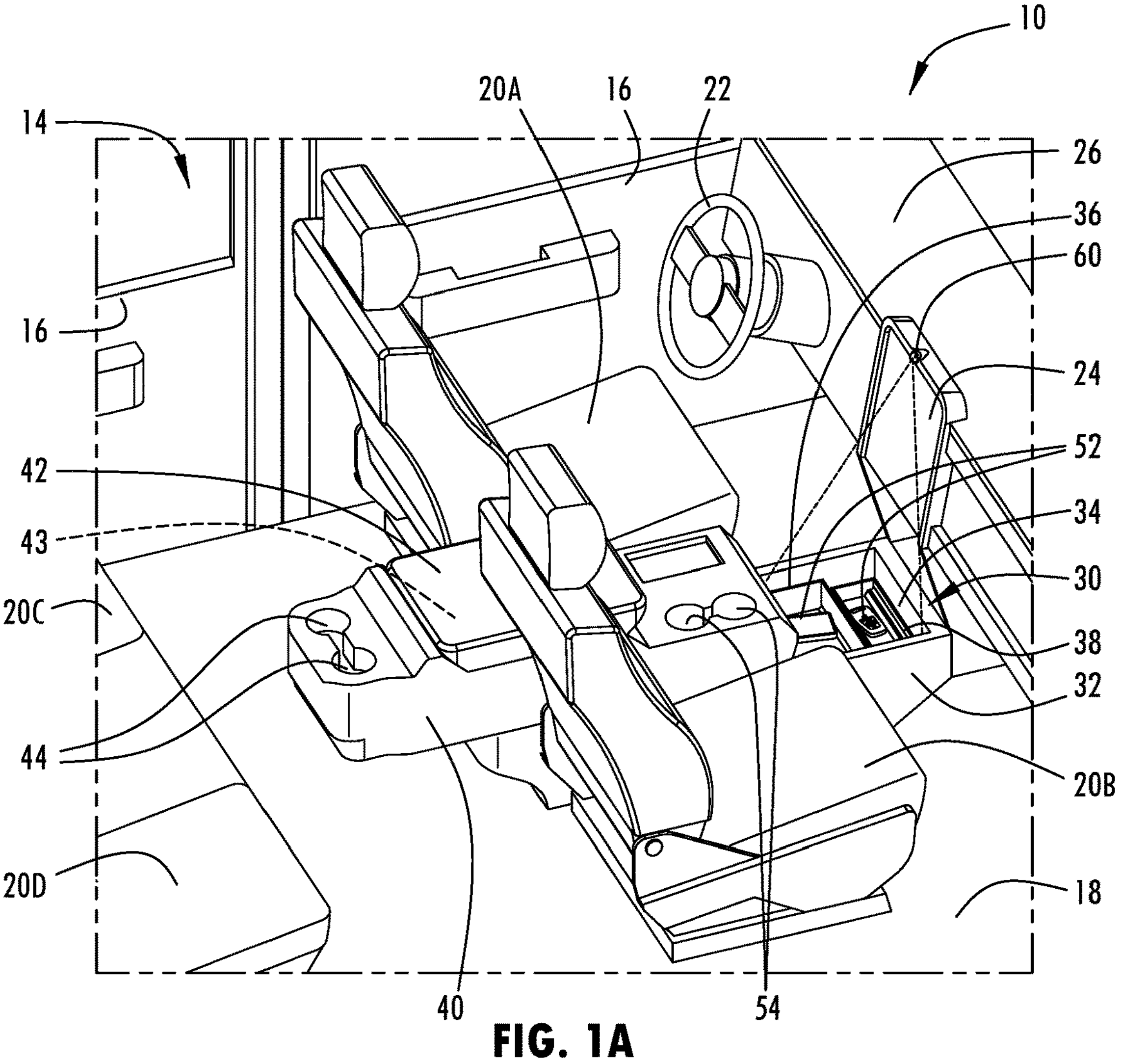
FIG. 1A is an enlarged side perspective view of the cabin interior of the motor vehicle further illustrating the center console in the open console position.

Reference will now be made in detail to the preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle center console having a powered cover and a method of controlling the powered cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating for transporting one or more passengers including a driver of the motor vehicle 10 and for further transporting one or more items onboard the motor vehicle 10. The motor vehicle 10 has a vehicle body 12 that generally defines a cabin interior 14. The cabin interior 14 may contain various features and trim components. The cabin interior 14 is shown having an arrangement of front row passenger seats including a first seat assembly 20A configured to seat a driver and a second seat assembly 20B configured to seat a passenger. The first and second seat assemblies 20A and 20B may be configured as captain seats, for example, laterally spaced apart and separated by space that includes a center console 30 that may be configured according to various embodiments shown and described herein. The motor vehicle 10 illustrated in the example also includes additional seating such as a second row of seating including third and fourth seat assemblies 20C and 20D which may be spaced apart or connected with a middle seat. The motor vehicle 10 may include additional rows of seating as is common for a large SUV, van, or bus. It should be appreciated that the motor vehicle 10 may be a motor vehicle, such as a wheeled car, truck, SUV, van, or bus, for example, or an airplane, train, boat, or other vehicle capable of transporting one or more passengers and items.

The motor vehicle 10 is illustrated with the front row of seating having the first seat assembly 20A located on one lateral side (e.g., the left side) of the front row and vehicle rearward of a dashboard 26 and a steering wheel 22 and configured for seating a driver of the motor vehicle 10. The first seat assembly 20A generally includes a seat base and a seat back that may articulate relative to the seat base and may be adjusted in various positions. The second seat assembly 20B is shown positioned in the vehicle rearward of the dashboard 26 on the opposite lateral side (e.g., right side) of the front row of seating and has a seat base and a seat back configured for seating a passenger. The second seat assembly 20B may likewise articulate and adjust amongst a plurality of positions. The vehicle body 12 has a plurality of side doors 16 that allow the driver and passengers to enter and exit the cabin interior 14 to access the seat assemblies 20A-20F. In the example shown, the driver seat assembly 20A is located adjacent to a lateral left side door 16 and the passenger seat assembly 20B is located adjacent to an opposite lateral right side door 16. Passengers may gain access to or exit from the second row of seat assemblies 20C-20D via the rear side doors 16.

The cabin interior 14 is shown equipped with a center console 30 located in the space between the driver first seat assembly 20A and the passenger second seat assembly 20B in the front first row of seating. It should be appreciated that the center console 30 or additional center consoles may be located at various locations within the motor vehicle 10, such as between other adjacent seat assemblies. For example, a center console may be located in a space between the third and fourth seat assemblies 20C and 20D.

The center console 30 is shown in FIGS. 1-3B, having a lower housing 32 which may be fixedly connected to the underlying floor 18 such as via fasteners. The lower housing 32 has various sidewalls and defines a first compartment 34 which has an open top end. The first storage compartment 34 may have a generally rectangular shape or other shapes and sizes. Located within the first storage compartment 34 is a first tray 36 and a second tray 38 which is forward of the first tray 36. In the example shown, a first item 52 is shown located in the first tray 36, and a second item 52 is shown located in the second tray 38. The first storage compartment 34 may be utilized to hold one or more items including items of value.

The center console 30 has an upper housing 40 located above and operatively coupled to the lower housing 32 which serves as a powered cover or topper that may be power actuated to translate and move forward and rearward relative to the lower housing 32. The upper housing 40 has a bottom wall 41 and sidewalls that define a second storage compartment 43. The second storage compartment 43 may be at least somewhat rearward of the first storage compartment 34. The second storage compartment 43 has an open top end which is covered with a pivoting lid 42 that may be pivoted about the rear end to an open position to allow access to the second storage compartment 43 or to a closed position to close the second storage compartment 43. The lid 42 may also serve as an armrest for an occupant to the vehicle seated in either the driver's seat 20A or passenger seat 20B. The upper housing 40 also includes a plurality of drink holders 44 and 54 and may include other accessories.

Figure 1B:
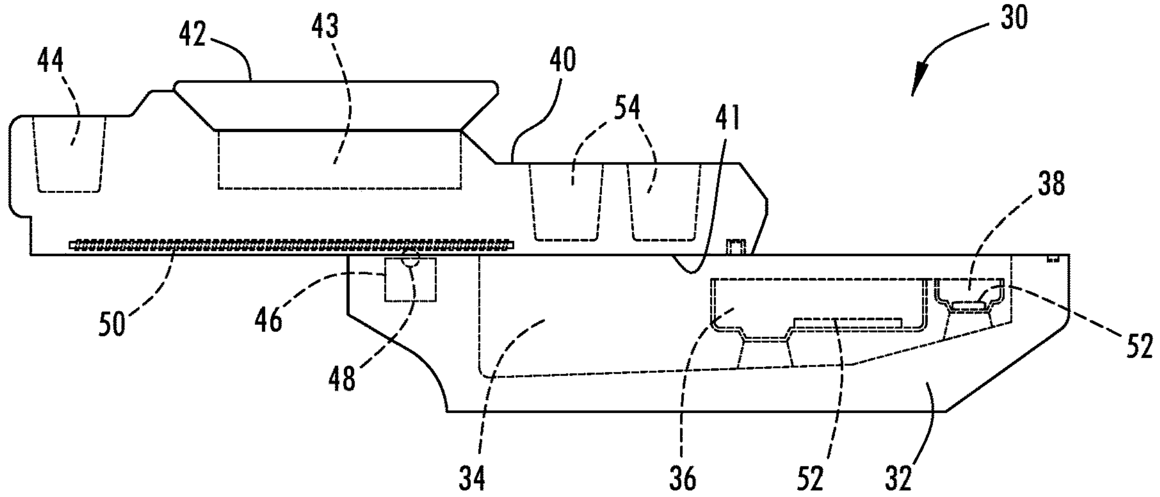
FIG. 1B is a side schematic view of the center console shown in the open storage compartment position.
Figure 2:
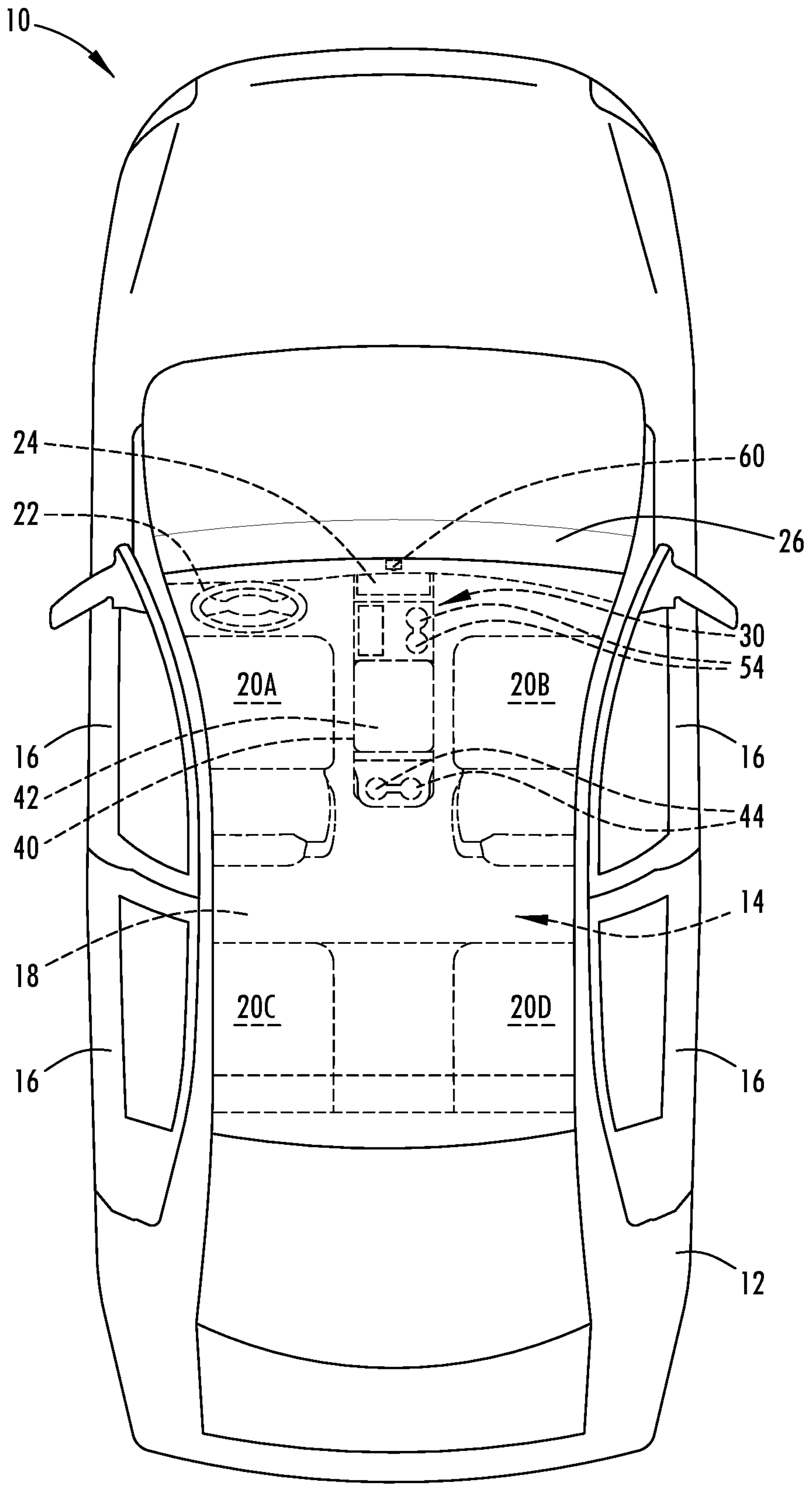
FIG. 2 is a top schematic view of the motor vehicle shown with the center console in a covered storage compartment position.
Figure 2A:
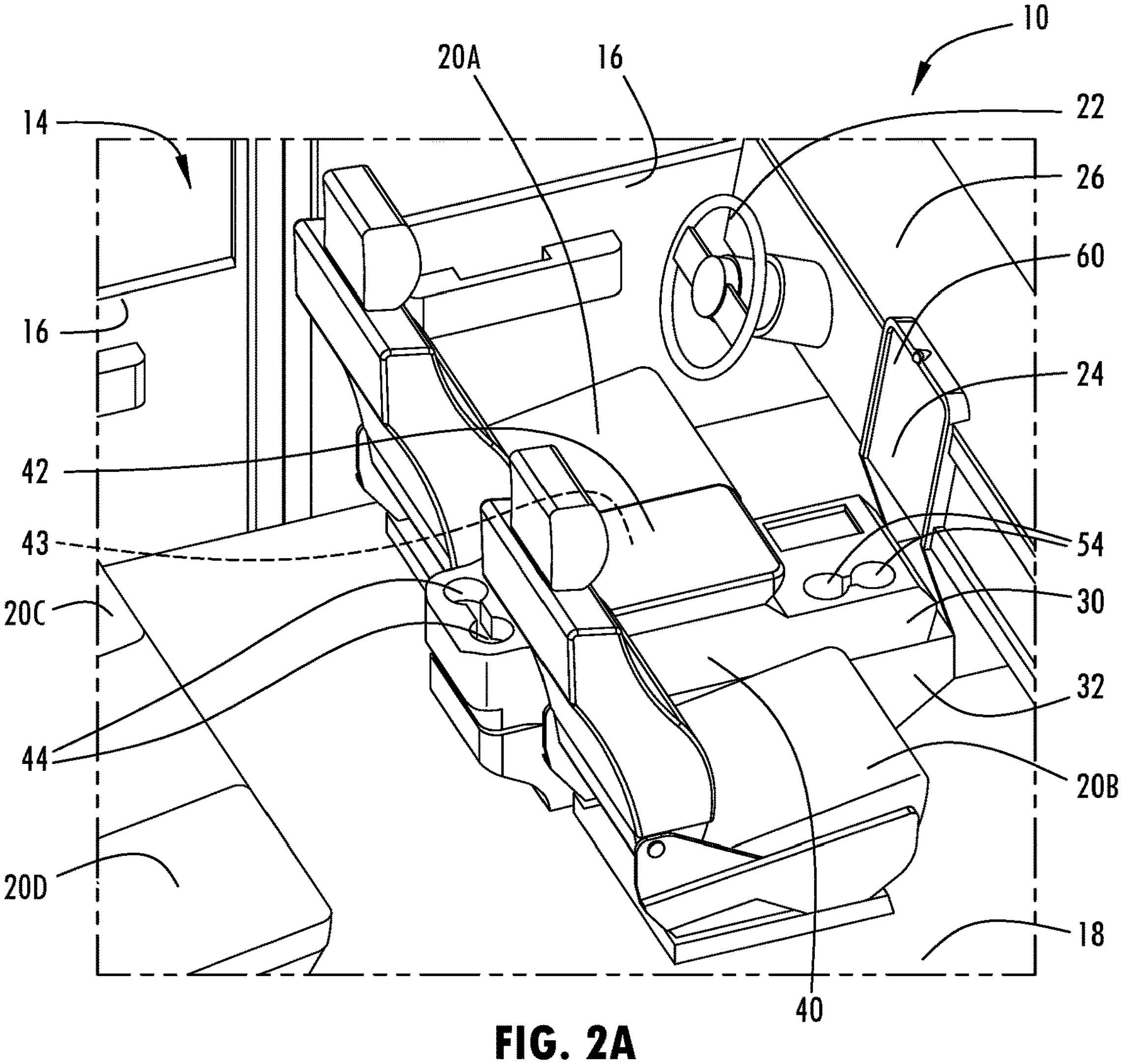
FIG. 2A is an enlarged side perspective view of the cabin interior further illustrating the center console in the closed storage compartment position.
Figure 2B:
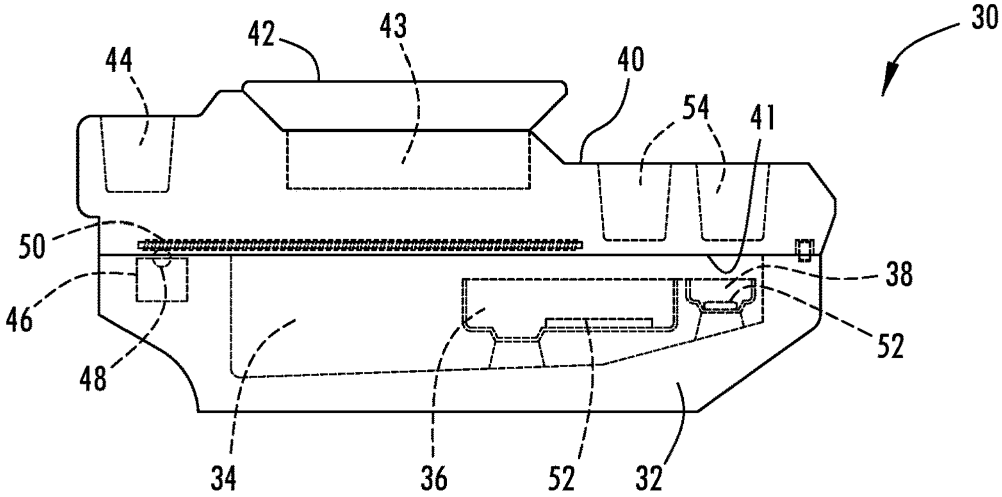
FIG. 2B is a schematic side view of the center console shown in the closed storage compartment position.

The upper housing 40 is coupled to the lower housing 32 and configured to move linearly between a rearward open compartment position as seen in FIGS. 1-1B and a forward closed compartment position shown in FIGS. 2-2B. In the open compartment position, the upper housing 40 is positioned above and at least partially rearward of the lower housing 32 to expose the first storage compartment 34 in the open storage compartment position. In this position, the lower bottom wall 41 of the upper housing 40 exposes at least a portion of the open first storage compartment 34. The center console 30 has a linear actuator 50, such as a drive or worm screw, that is configured to drive the upper housing 40 between the open storage compartment position shown in FIGS. 1-1B and the closed storage compartment position shown in FIGS. 2-2B. In the closed storage compartment position, the upper housing 40 serves as a cover that covers the upper opening of the first storage compartment 34 with the bottom wall 41 to conceal items that are stored within the first storage compartment 34. To activate the upper housing 40 relative to the lower housing 32, the linear actuator 50 may include an electric motor 46 operatively coupled to a worm gear 48 to drive a linear actuator 50, according to one example. It should be appreciated that other types of linear actuators and other types of actuators may be employed to actuate the upper housing 40 between the open and closed compartment positions. It should also be appreciated that the upper housing 40 may be coupled to the lower housing 32 via a track or other connector that allows for sliding movement.

Figure 3A:
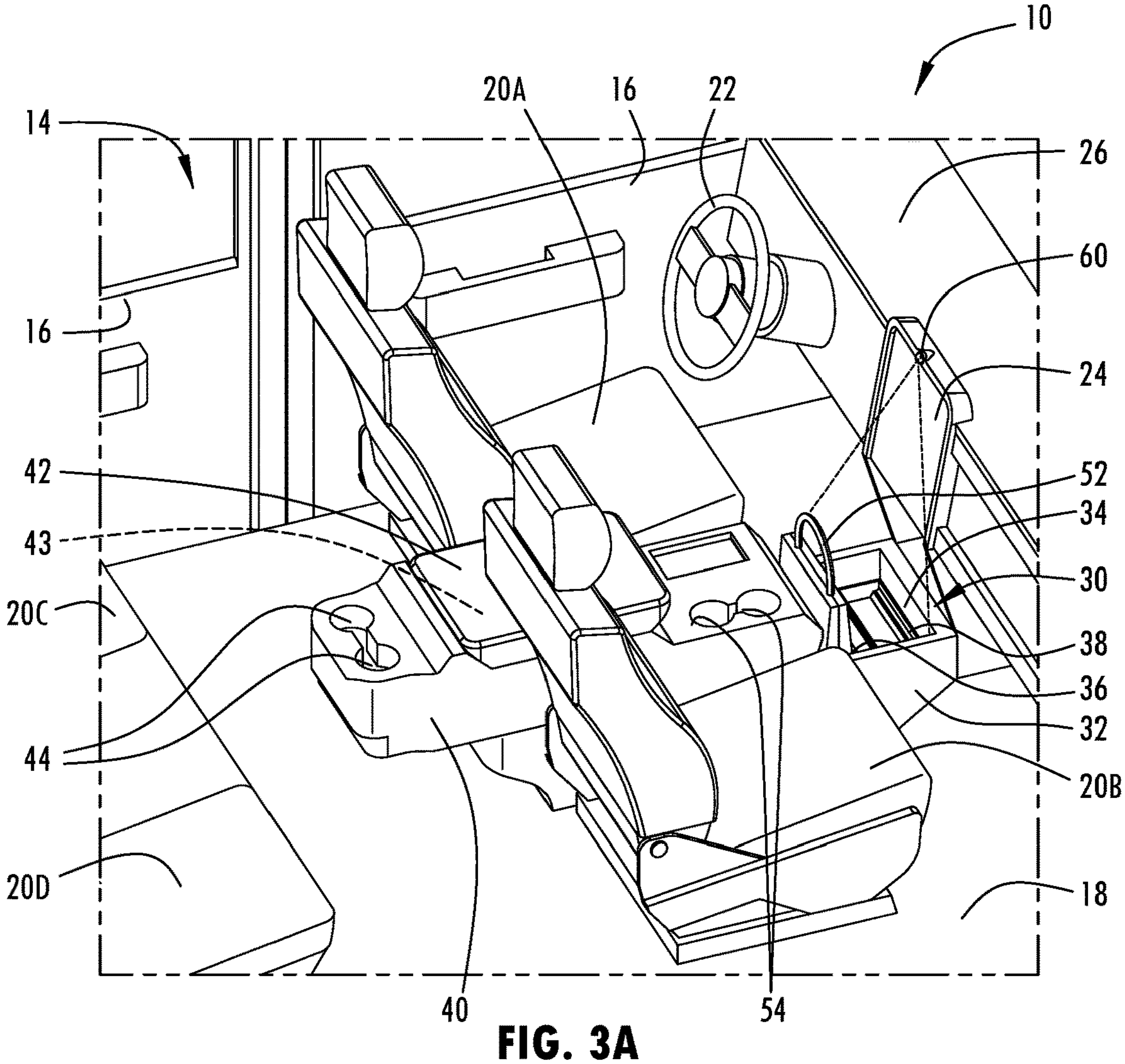
FIG. 3A is a side perspective view of the cabin interior of the vehicle illustrating the center console in the open storage compartment position with a large item extending from the storage compartment.
Figure 3B:
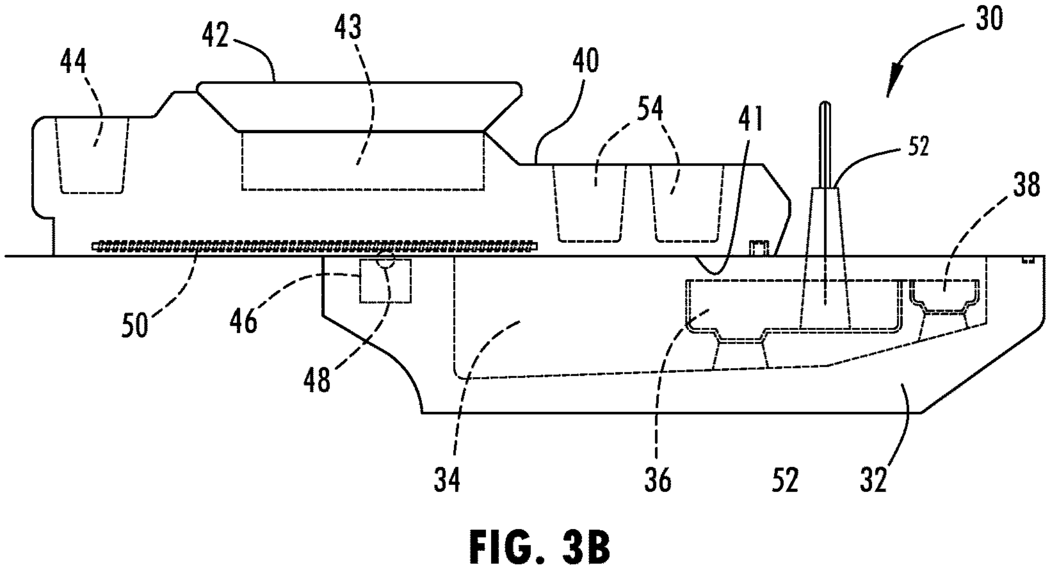
FIG. 3B is a side schematic view of the center console shown in FIG. 3A with the large item extending out of the storage compartment.

The motor vehicle 10 is equipped with at least one sensor 62 including an imaging camera 60 located in the motor vehicle 10 and oriented to capture images of the first storage compartment 34 when the upper housing 40 defining the cover is in the open storage compartment position. The imaging camera 60 is shown generally located forward and above the center console 30 generally in a dashboard 26 of the motor vehicle 10 above a touchscreen display 24 according to one example. The imaging camera 60 may include one or more cameras located at various locations such as in the overhead console, the roof, the mirror housing or mount, inside the console compartment 34, or elsewhere with a view of the first storage compartment 34. The imaging camera 60 captures images of the first storage compartment 34 to capture any items 52 contained within the first storage compartment 34. In addition, the sensors 62 may also include a radar sensor 64 for sensing dimensions of an item in the first storage compartment 34, such as whether the item is too large as shown in FIGS. 3A and 3B and will interfere with the closing of the cover as the upper housing 40 moves towards the closed compartment position. Door sensors 66 may sense a door open or closed state to determine if an occupant is leaving the vehicle. A motor current sensor 68 may sense the electric current of the actuator motor to determine if an interfering force is experienced during closing of the cover, for example. If the camera 60, the motor current sensor 68, or other sensor(s) detects an obstacle as an obstruction, the cover may close as much as possible or may be reversed to the prior position and a notification may be sent to the user.

Figure 4:
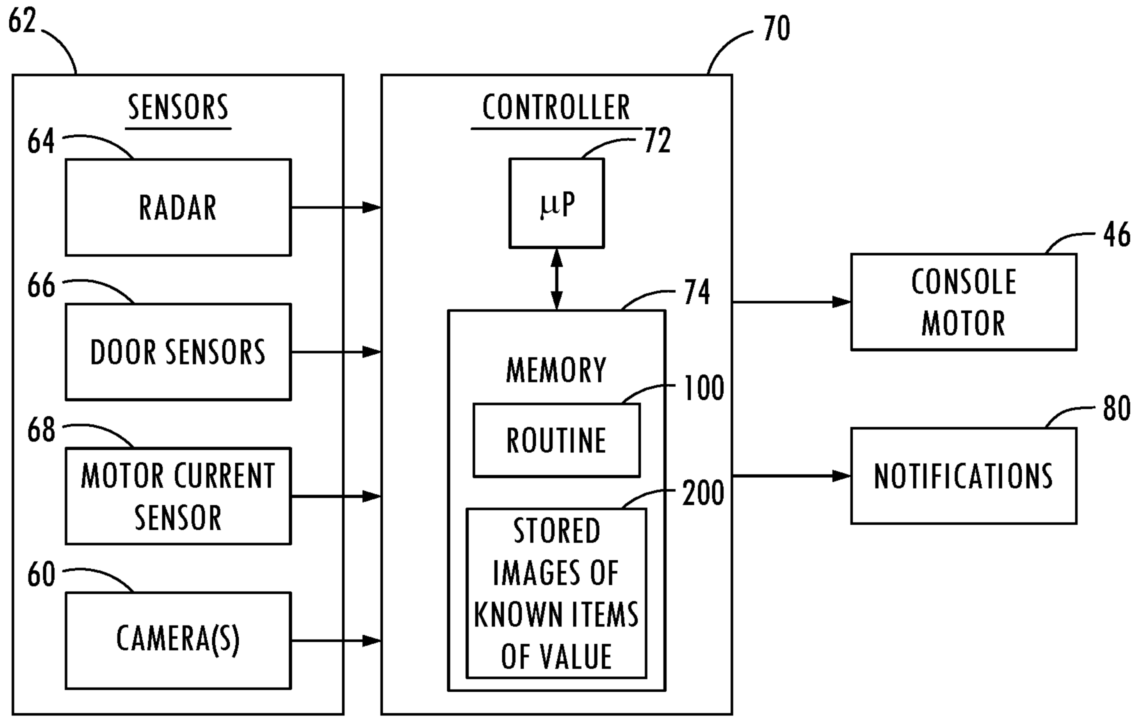
FIG. 4 is a block diagram illustrating the controls for controlling the movement of the cover of the center console.

The various sensors 62 generate outputs in the form of signals that are input to and processed by a controller 70 as seen in FIG. 4. The controller 70 may include a microprocessor 72 and memory 74, according to one example. Stored within memory 74 may be stored images of valuable items and one or more routines 100 for processing the sensed signals including the captured images to detect one or more objects to be determined as a value within the first storage compartment and to control the center console motor 46 and provide notifications 80 that may be transmitted to the owner or a user such as to a phone, for example. The notifications may notify a user that valuable items were detected and that the cover was closed. It should be appreciated that other shared or dedicated controllers having analog and/or digital circuitry may be employed to process the sent signals and generate the control signals to control the cover and provide notifications as described herein.

Figure 5:
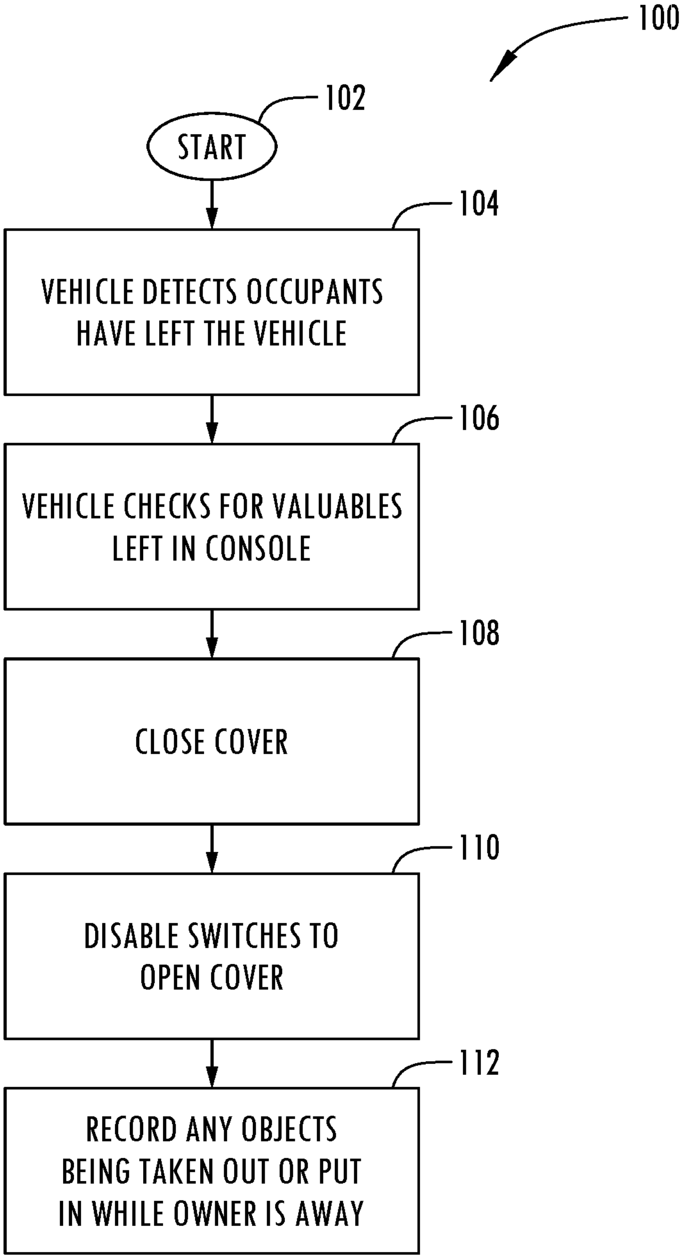
FIG. 5 is a flow diagram illustrating a routine for controlling movement of the center console, according to one example.

One example of the routine 100 for controlling the cover of the center console is shown in FIG. 5. Routine 100 begins at step 102 and proceeds to step 104 when the vehicle detects that the occupants have left the vehicle. Next, at step 106, routine 100 checks for any valuable items left in the first storage compartment of the center console. This is achieved by generating or capturing images and processes the images to determine if items are present in the first storage compartment and if the items are identifiable as items of value, such as a wallet, a purse, a money clip, a phone, a computer, etc. The image processing may compare the captured images to known items of value to detect a valuable item. Items of value may be determined based on a cost value of an identifiable item or a designation by a user such as the owner that an item is of value (i.e., commercial or sentimental value). If a valuable item is detected in the open first storage compartment when in the open compartment position, routine 100 commands the actuator to drive the upper housing defining the cover to move to the closed storage compartment position to cover the one or more detected items of value. Next, in step 110, routine 100 disables switches to open the cover and then records any objects being taken out or put in the compartment while the owner is away at step 112. As such, the vehicle may automatically cover up any items of value left within the first storage compartment, particularly when occupants of the vehicle have departed the motor vehicle 10 and potentially left such items in view. The moveable upper housing defining the cover thereby forms a safe box that may be locked in the closed position until authorized by the owner. A cover switch disable may be triggered by an electronic device lock, i.e., a key fob or a Phone-as-a-Key (PaaK) phone, or an exterior Passive Entry/Passive Start (PEPS) lock or exterior keypad lock. The switches may be re-enabled by an unlock command from a nomadic key or the exterior keypad or entry of a keycode on a cabin internal screen, or the cover switch may be re-enabled passively when a PEPS fob or a PaaK phone that left the vehicle when disabled is detected again in the cabin.

Once the topper is in a closed state and is covering the object, the forward and reverse switches may be ignored until the vehicle is unlocked. Users may also configure the system to ignore the forward and reverse switches until a PIN code is entered into the touch screen, exterior keypad, or an authorized phone is detected in the cabin interior. The vehicle using interior cameras may record objects being put in and taken out of the compartment while the owner is away and can play pictures/video clips when the owner returns. The vehicle may also notify the owner when the compartment is accessed or beam video to the owner's phone. Once the vehicle owner/registered occupants come back into the vehicle, the cover will revert back to an unlocked state and into the previous position. The center console locking mechanism can also be employed any time the vehicle is unlocked, when a vehicle is being towed, while at a car wash, while in a valet mode, etc., to ensure the user's belongings stay inaccessible to unauthorized users. In a setting where an occupant uses the lockable center console cover to store an item, the cover may only reopen for that user or for the owner of the vehicle in some embodiments.

Accordingly, the motor vehicle 10 is advantageously equipped with a center console 30 having a powered cover and image processing that identifies items of value and automatically closes a cover on the first storage compartment to cover the determined items of value. This ensures that the items of value are left protected and not easily accessed by unauthorized occupants.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a console having a base housing comprising a first compartment having an opening;

a powered cover coupled to the base housing and configured to move between an open compartment position exposing the opening of the first compartment and a closed compartment position covering the opening of the first compartment;

at least one sensor including an imaging camera located in the vehicle and orientated to capture images of the first compartment when the cover is in the open compartment position;

image processing for processing the captured images and detecting one or more objects determined to be of value based on comparing captured images to known images of valuable items stored in memory located within the first compartment; and a controller controlling the powered cover to move the powered cover from the open compartment position to the closed compartment position in response to detecting that occupants have left the vehicle when an item of value is detected located within the first compartment.

2. The vehicle of claim 1, wherein the powered cover is operatively coupled to an actuator that actuates the cover between the open compartment position and the closed compartment position.

3. The vehicle of claim 2, wherein the actuator comprises a linear actuator.

4. The vehicle of claim 2, wherein the actuator comprises a motor.

5. The vehicle of claim 1, wherein the opening is an open top end of the first compartment.

6. The vehicle of claim 1, wherein the vehicle further comprises a first seating assembly and a second seating assembly wherein the console is a center console disposed within a space between the first and second seating assemblies.

7. The vehicle of claim 1, wherein the vehicle further comprises a first tray disposed within the first compartment for holding one or more items.

8. The vehicle of claim 1, wherein the image processing compares captured images to known images stored in memory.

9. The vehicle of claim 1 further comprises a second compartment provided in the base housing wherein the second compartment further comprises a pivoting lid that pivots between an open lid position and a closed lid position.

10. The vehicle of claim 9, wherein the pivoting lid further operates as an armrest.

11. The vehicle of claim 9, wherein the second compartment is located rearward of the first compartment.

12. A vehicle comprising:

a center console having a base housing comprising a first compartment having an open top end;

a powered cover coupled to the base housing and having an actuator configured to move the powered cover between an open compartment position exposing the first compartment and a closed compartment position covering the first compartment;

at least one sensor including an imaging camera located in the vehicle and orientated to capture images of the compartment when the cover is in the open compartment position;

image processing for processing the captured images and detecting one or more objects determined to be of value based on comparing captured images to known images of valuable items stored in memory located within the first compartment; and a controller controlling the powered cover to move the powered cover from the open compartment position to the closed compartment position in response to detecting that occupants have left the vehicle when an item of value is detected located within the first compartment.

13. The vehicle of claim 12, wherein the actuator comprises a motor.

14. The vehicle of claim 13, wherein the actuator is a linear actuator.

15. The vehicle of claim 12, wherein the vehicle further comprises a first tray disposed within the first compartment for holding one or more items.

16. The vehicle of claim 12, wherein the image processing compares captured images to known images stored in memory.

17. The vehicle of claim 12 further comprises a second storage compartment provided in the base housing wherein the second storage compartment further comprises a pivoting lid that pivots between an open lid position and a closed lid position.

18. The vehicle of claim 17, wherein the pivoting lid further operates as an armrest.

19. The vehicle of claim 18, wherein the second storage compartment is located rearward of the first compartment.

* * * * *